United States Patent
Kawamura et al.

(10) Patent No.: US 8,888,656 B2
(45) Date of Patent: Nov. 18, 2014

(54) SHIFT MISTAKE DETECTION APPARATUS

(75) Inventors: Yasuyuki Kawamura, Chiryu (JP);
Tomohiro Tsujimura, Obu (JP)

(73) Assignee: Denso Corporation, Kariya (JP)

( * ) Notice: Subject to any disclaimer, the term of this patent is extended or adjusted under 35 U.S.C. 154(b) by 292 days.

(21) Appl. No.: 13/531,194

(22) Filed: Jun. 22, 2012

(65) Prior Publication Data

US 2012/0329605 A1 Dec. 27, 2012

(30) Foreign Application Priority Data

Jun. 24, 2011 (JP) ................................ 2011-140384

(51) Int. Cl.
| | |
|---|---|
| F16H 59/48 | (2006.01) |
| F16H 61/18 | (2006.01) |
| B60W 50/08 | (2012.01) |
| B60W 50/10 | (2012.01) |
| F16H 61/16 | (2006.01) |
| F16H 59/18 | (2006.01) |

(52) U.S. Cl.
CPC ............. *F16H 61/18* (2013.01); *B60W 50/087* (2013.01); *B60W 50/10* (2013.01); *B60W 2530/14* (2013.01); *B60W 2540/10* (2013.01); *B60W 2540/106* (2013.01); *B60W 2540/12* (2013.01); *B60W 2540/16* (2013.01); *F16H 2061/165* (2013.01); *F16H 59/18* (2013.01); *Y10S 477/904* (2013.01); *Y10S 477/906* (2013.01)
USPC ............................ 477/120; 477/904; 477/906

(58) Field of Classification Search
USPC ................. 477/115, 120–122, 125, 904, 906; 701/53, 54, 58, 59, 62, 70
See application file for complete search history.

(56) References Cited

U.S. PATENT DOCUMENTS

| | | | | |
|---|---|---|---|---|
| 4,891,758 A | * | 1/1990 | Simonyi et al. .................. | 701/62 |
| 4,955,255 A | * | 9/1990 | Yamaashi et al. ............... | 477/94 |
| 5,105,923 A | * | 4/1992 | Iizuka ............................. | 192/220 |
| 6,314,801 B1 | * | 11/2001 | Reggiardo .................. | 73/112.01 |
| 6,699,155 B2 | * | 3/2004 | Nagasaka ....................... | 477/94 |

FOREIGN PATENT DOCUMENTS

| | | | |
|---|---|---|---|
| JP | 06276603 A | * | 9/1994 |
| JP | 06299880 A | * | 10/1994 |

* cited by examiner

*Primary Examiner* — Justin Holmes
(74) *Attorney, Agent, or Firm* — Nixon & Vanderhye PC

(57) ABSTRACT

A shift mistake detection apparatus detects an operation value of an accelerator pedal in a vehicle and a shift range selected by a shift operation of a driver of the vehicle (e.g. reverse, drive, park). The apparatus detects a shift mistake operation when (i) the shift range selected by the shift operation is in a reverse range and the vehicle begins to travel in reverse according to an operation of the accelerator pedal, and (ii) a steep step operation and a steep return operation of the accelerator pedal is detected. The steep step and return operations of the accelerator pedal have an operation value that is greater than or equal to a normal operation value, where the normal operation value may be a value detected when a driver of a vehicle intentionally travels in reverse (i.e., there is no shift mistake).

10 Claims, 6 Drawing Sheets

SHIFT MISTAKE DETECTION APPARATUS

CROSS REFERENCE TO RELATED APPLICATION

This application is based on and claims the benefit of priority of Japanese Patent Application No. 2011-140384 filed on Jun. 24, 2011, the disclosure of which is incorporated herein by reference.

TECHNICAL FIELD

The present disclosure generally relates to a detection of a shift mistake of a vehicle.

BACKGROUND

When the driver mistakenly shifts a gear into a reverse range (i.e., an R-range) instead a drive range (i.e., a D-range), the vehicle may accelerate in the reverse direction. As a result the vehicle may come in contact with an object, such as another vehicle, since the driver was not prepared to travel in the reverse direction.

To prevent such a situation, Japanese Patent Laid-Open No. H06-276603 (JP '603) discloses that, if the driver operates the accelerator pedal by an amount exceeding a preset threshold after shifting to the R range, a detection apparatus detects such operation as a shift mistake, and prevents a sudden acceleration of the vehicle in the reverse direction by restricting the vehicle's drive power.

Further, Japanese Patent Laid-Open No. H06-299880 (JP '880) discloses that, when (1) a first set time has passed from releasing a brake pedal step operation, (2) a second set time has not passed from a shift operation, and (3) either an accelerator operation amount or an accelerator operation speed is equal to or greater than a threshold, the situation is determined as a mis-operation of an accelerator pedal, and an operation of an internal combustion engine is controlled to prohibit a travel of the vehicle.

In JP '603, if the driver operates the accelerator pedal by an amount exceeding a preset threshold after shifting to the R-range, the detection apparatus detects such operation as a shift mistake. However, in such shift mistake detection scheme, even when the vehicle has to go over a bump or a difference just after starting from a stop condition by increasing a vehicle driving torque, the detection apparatus automatically detects a large amount (i.e., an over-threshold amount) of accelerator pedal operation by the driver according to his/her intention to increase the vehicle driving torque, and mis-determines that such a large amount of accelerator pedal operation is a shift mistake of the driver, leading to a restriction on the vehicle driving torque.

Further, the technique of JP '880 can simply detect a mistake of an accelerator pedal operation by the driver who has mistaken the accelerator pedal for the brake pedal, without detecting a shift mistake.

SUMMARY

In an aspect of the present disclosure, a shift mistake detection apparatus includes an accelerator pedal step amount detection unit, a shift range detection unit, and a shift mistake detection unit. The accelerator pedal step amount detection unit detects an operation value of an accelerator pedal and the shift range detection unit detects a shift range selected by a shift operation. The shift mistake detection unit detects a shift mistake. Specifically, the shift mistake detection unit detects a shift mistake when (i) the shift range selected by the shift operation is in a reverse range based on a detection result of the shift range detection unit and the vehicle begins to travel in reverse according to an operation of the accelerator pedal, and (ii) a steep return operation of the accelerator pedal is detected.

The steep return operation of the accelerator pedal is determined as "steep," based on an operation value detected by the accelerator pedal step amount detection unit, which is equal to or greater than a threshold. The threshold may be defined as a boundary between a normal and an abnormal return operation of the accelerator pedal, and the normal return operation of the accelerator pedal is a behavior of a return operation of the accelerator pedal performed by the driver when he/she shifts the shift range (i.e., a gear) into the reverse range, in a manner that may be described as "securely," "confidently" and/or "not hastily" at a normal and intentional back up time of the vehicle.

Generally, when the driver has mistakenly shifted a gear to a reverse range (i.e., an R-range) while actually having an intention to shift to a drive range (i.e., a D-range), and if the driver does not know of the shift mistake and steps on the accelerator pedal, the driver hastily performs a steep return operation of the accelerator pedal, and applies a steep brake operation after recognizing a shift mistake when the vehicle starts to move in the backward direction against his/her intention.

The shift mistake detection apparatus utilizes the above described tendency of a driver to steeply return the accelerator pedal at the time of a shift mistake, for determining that a shift mistake in the reverse range is in progress. In such manner, the shift mistake in the reverse range may be detected based on the steep return operation of the accelerator pedal.

BRIEF DESCRIPTION OF THE DRAWINGS

Other objects, features and advantages of the present invention will become more apparent from the following detailed description made with reference to the accompanying drawings, in which.

DETAILED DESCRIPTION

The present disclosure is now described in more detail with reference to the drawings.

Figure 1:
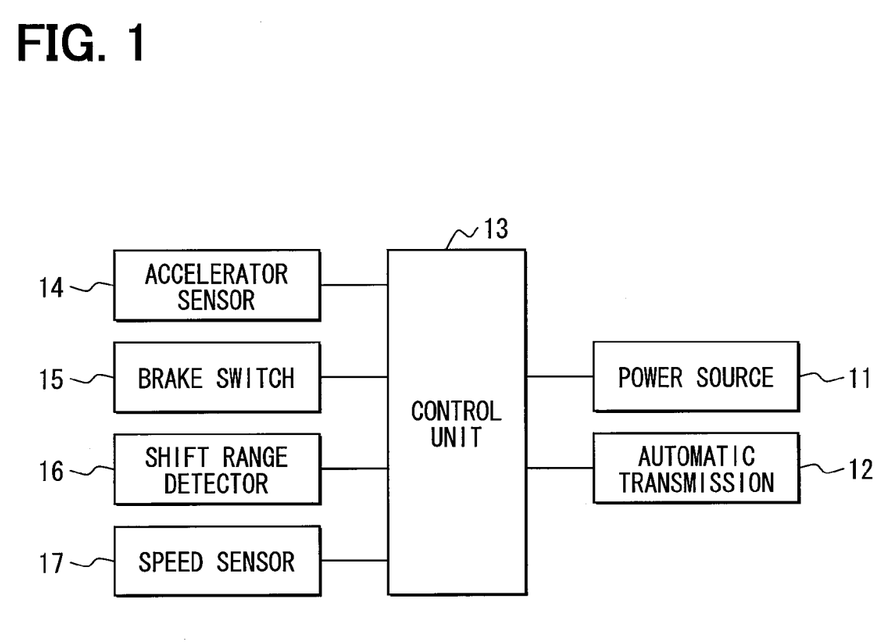
FIG. 1 is a block diagram of a vehicle control system of the present disclosure.

With reference to FIG. 1, a vehicle control system of a vehicle includes a power source 11 to provide the driving power of the vehicle. The power source may be an internal combustion engine, a motor, or a combination of an engine and a motor. An output from the power source 11 is transmitted through an automatic transmission 12 and a propeller shaft (not illustrated) to rotate the tires (not illustrated) of the vehicle.

The vehicle control system also includes a control unit 13 for controlling the power source 11 and the automatic transmission 12, and may be implemented as one or more ECUs (i.e., a microcomputer). The control unit 13 is coupled to various components, such as an accelerator sensor 14, a brake switch 15, a shift range detector 16, and a speed sensor 17, as well as other sensors and switches. The accelerator sensor 14 detects the extent of depression or actuation of an accelerator pedal by a driver of the vehicle (i.e., an amount of stepping operation of an accelerator pedal). The brake switch 15 (i.e., a brake operation detection unit in claims) detects a brake operation or the extent of depression or actuation of a brake pedal (i.e., an amount of stepping operation of the brake pedal) by the driver. The shift range detector 16 (i.e., a shift range detection unit in claims) detects a shift range (i.e., gear), such as park, neutral, drive, and reverse, selected by a shift operation by the driver. The speed sensor 17 detects a speed of the vehicle.

Figure 2:
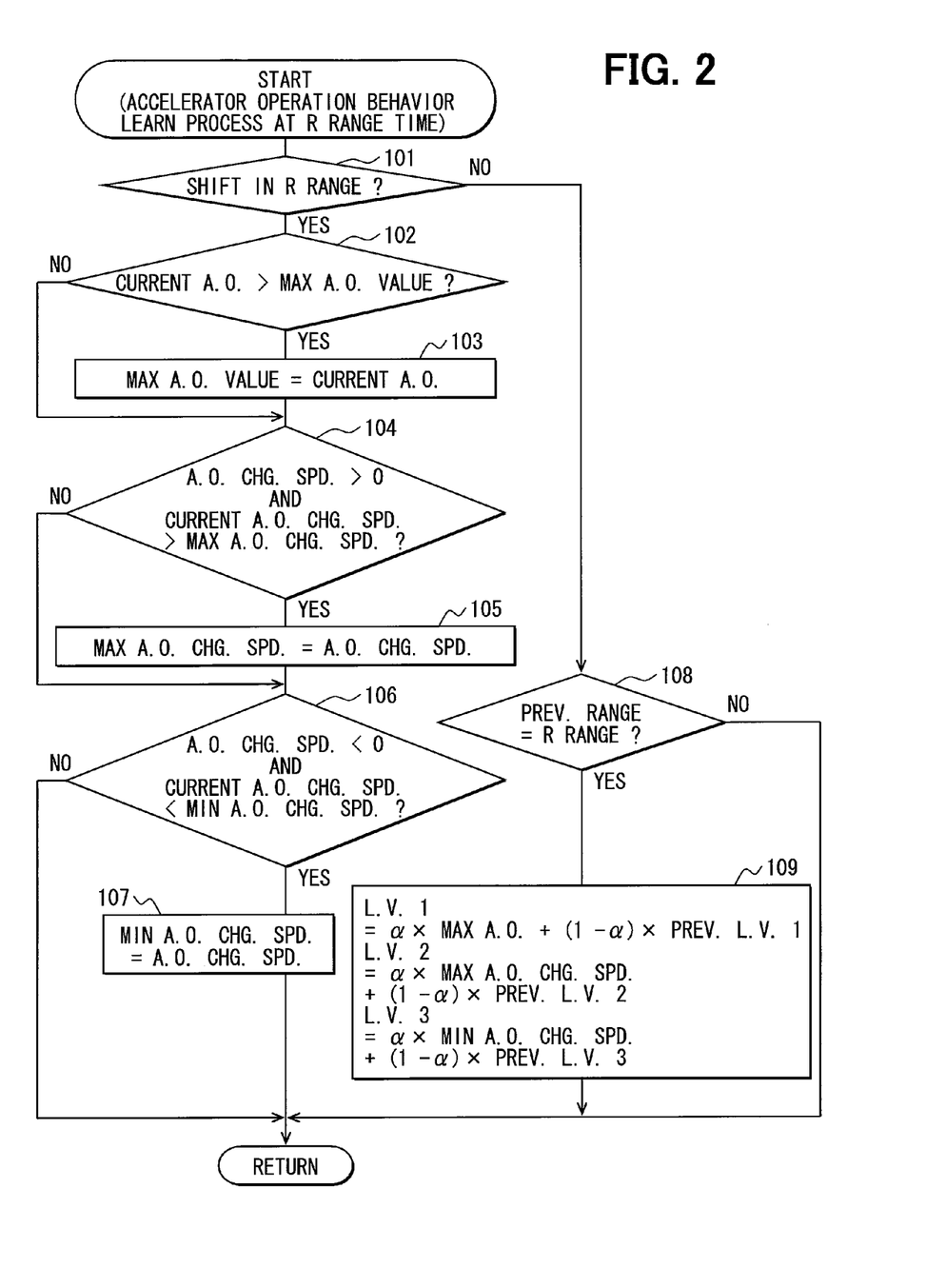
FIG. 2 is a flowchart of an accelerator operation behavior learn process at an R-range time of the present disclosure.
Figure 4:
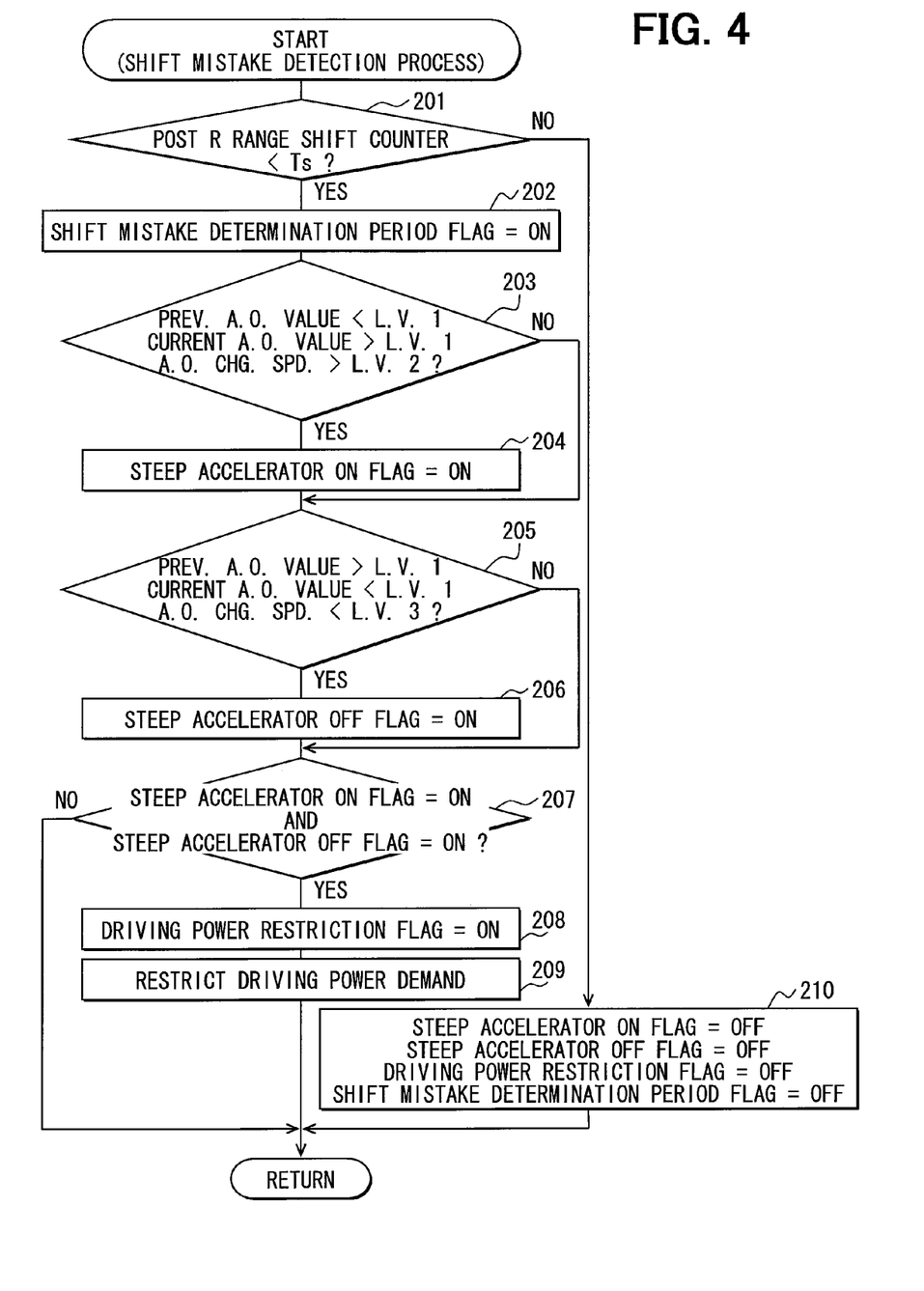
FIG. 4 is a flowchart a shift mistake detection process of the present disclosure.
Figure 5:
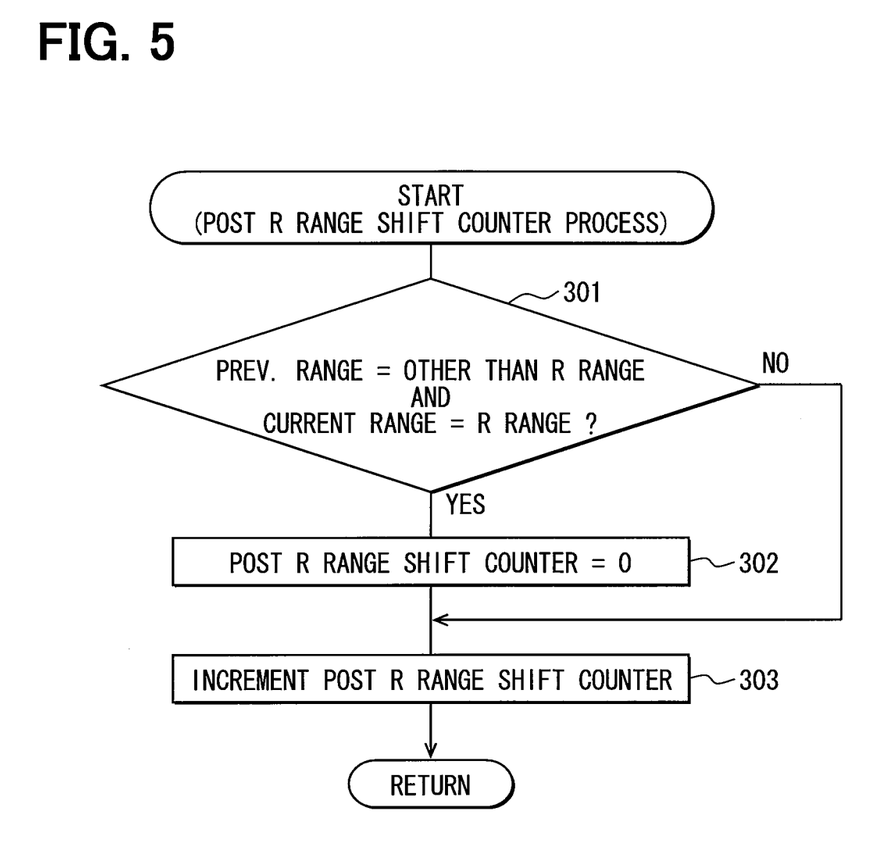
FIG. 5 is a flowchart of a post R-range shift counter process of the present disclosure.

The control unit 13 executes each of the processes shown in FIGS. 2, 4, 5, which is provided as a shift mistake detection unit in claims, for detecting a shift mistake. A switch mistake is provided as a situation in which, after a gear of vehicle is changed (i.e. shifted) to a reverse (R-range), which is detected by the shift range detector 16, and when the vehicle begins to travel in reverse according to an accelerator pedal operation, both a steep step depression and a steep return operation of the accelerator pedal by the driver is detected, and such step and return operations are detected based on a detection value by the accelerator sensor 14 as being equal to or greater than a threshold. Therefore, the control unit 13 serves as a shift mistake detection unit in claims.

The steep accelerator pedal step operation equal to or greater than a threshold in this case is, an accelerator pedal step operation that is more steeply performed than a "normal" accelerator pedal step operation performed by the driver at a time of a normal reverse travel of the vehicle without a shift mistake mistakenly shifting the gear into the R-range. The steep return operation of the accelerator pedal is an accelerator pedal return operation that is more steeply performed than a normal return operation of the accelerator pedal by the driver at a time of the normal reverse travel of the vehicle. The normal return operation of the accelerator pedal is a return operation of the accelerator pedal performed by the driver when he/she shifts the shift range (i.e., a gear) into the reverse range, in a manner that may be described as "securely," "confidently" and/or "not hastily" at a normal and intentional back up time of the vehicle.

Generally, when the driver starts to drive the vehicle in a forward direction from a stop condition, the driver tends to exert a greater depression force onto the accelerator pedal and/or operates the acceleration pedal at a faster speed than when the driver starts to drive the vehicle in the reverse direction from a stop condition. Therefore, when the driver has mistakenly placed the gear into the R-range or is not aware that the gear is in the R-range, the driver may exert a greater depression force to the accelerator pedal than a normal depression force exerted on the accelerator pedal by the driver that knowingly places the gear in the R-range or knows the gear is in the R-range. As a result, when the gear is mistakenly in the R-range (i.e. a shift mistake), an accelerator pedal step operation by the driver, which is provided as an exertion of a depression force on to the accelerator pedal, is steeper than when the gear is intended in the R-range (i.e a normal shift).

Further, when the shift mistake occurs and the vehicle begins to travel in the reverse direction according to an operation of the accelerator pedal, the driver may hastily release the accelerator pedal and my apply a steep depression force onto the brake pedal after recognizing a shift mistake. The substantially immediate release of the accelerator pedal after the driver realizes the mistake in the shift range permits the accelerator pedal to return to its original state (i.e. with no depression force being applied) at a release rate that may be faster than when the driver is knowingly in the R-range. The release of the accelerator pedal may be provided as an accelerator pedal return operation.

In consideration of the accelerator pedal step operation and the accelerator pedal return operation, a shift mistake is determined upon detecting an accelerator pedal step operation having a greater depression force and an accelerator pedal return operation having a steeper or faster release than a normal depression force and a normal release rate, respectively. In other words, a shift mistake, provided as the gear unintentionally or mistakenly placed in the R-range, is determined when a greater depression force is applied during the accelerator pedal step operation and a faster release during the accelerator pedal return operation is detected than when the vehicle is intentionally operated in the R-range. The accelerator pedal step operation and the accelerator pedal return operation may be referred to as the step operation and the return operation, respectively, or the step/return operation for brevity.

The normal depression force for the step operation maybe provided as a preset depression threshold that a driver may apply to an accelerator pedal when the driver knowingly has the vehicle in the R-range and is intending to move the vehicle in R-range from the stop condition. Similarly, the normal release rate for the return operation may be provided as a preset release threshold that a driver may perform on the accelerator pedal when the driver knowingly has the vehicle in the R-range. The preset depression threshold and the preset release threshold are compared to a detected depression force placed on the accelerator pedal, which is detected by the accelerator sensor 14, to determine if a shift mistake has occurred.

However, since operation behaviors of the step/return operation may vary driver to driver, one predetermined threshold for uniformly determining the steep step/return operation may lead to a mis-determination of the steepness of the detected operation. In order to prevent such mis-determination, an operational tendency of the driver with respect to the accelerator pedal is learned by the control unit 13.

Specifically, the control unit 13 executes the process of FIG. 2, to learn the operational tendency of the driver with respect to the step operation and the return operation of the accelerator pedal during a normal shift (i.e., the driver intentionally has the vehicle in the R-range), based on the depression force detected by the accelerator sensor 14 after the gear is changed to the R-range. For example, a learned behavior of the step operation may include a fastest speed and the greatest depression force performed during a step operation, and a learned behavior of the return operation may include a fastest speed at which the return operation was performed. The learned behaviors for the step/return operations are stored in an updating manner in a backup RAM or the like which is a non-volatile memory serving as rewritable storage medium.

In the present embodiment, the accelerator sensor 14 detects an accelerator opening or an accelerator pedal position, which is representative of the depression force applied to the accelerator pedal. The accelerator opening is used as a learned behavior for the step operation, and the maximum detected value of the accelerator opening is stored as a learn value 1. Further, an accelerator opening change speed (i.e. a change amount of accelerator opening in a unit time) is used as information of an accelerator pedal step speed and an accelerator pedal return speed. Specifically, when the accelerator opening change speed is a plus or a positive value, an accelerator pedal step speed is indicated, when he accelerator opening change speed is a minus or a negative value, an accelerator pedal return speed is indicated. Therefore, as a learn value 2 indicating an accelerator pedal step speed, a maximum accelerator opening change speed (i.e., a plus value) is learned, and, as a learn value 3 indicating an accelerator pedal return speed, a minimum accelerator opening change speed (i.e., a minus value) is learned.

After the shift to the R-range, a steep accelerator pedal step operation is determined when the accelerator opening (i.e., the accelerator pedal step amount) detected by the accelerator sensor 14 is greater than the learn value 1 (i.e., the accelerator opening>the learn value 1), and the detected plus value of the accelerator opening change speed (i.e., the accelerator pedal step speed) is faster than the learn value 2 (i.e., the accelerator opening change speed>the learn value 2).

Further, after the shift to the R-range, a steep accelerator pedal return operation is determined, when the accelerator opening (i.e., the accelerator pedal step amount) detected by the accelerator sensor 14 is smaller than the learn value 1 (i.e., the accelerator opening<the learn value 1), and the detected minus value of the accelerator opening change speed (i.e., the accelerator pedal return speed) is faster than the learn value 3 (i.e., the accelerator opening change speed<the learn value 3).

Another behavior characteristic may be considered, specifically, when the vehicle begins to travel in reverse and the driver mistakenly has the shift in the R-range (i.e. a shift mistake operation), the driver recognizes the shift mistake and may hastily release the accelerator pedal to causing a steep accelerator pedal return operation. In other words, the steep accelerator pedal return operation caused by the shift mistake is performed immediately or substantially after the start of the reverse travel of the vehicle. Therefore, if a steep return operation of the accelerator pedal is performed long after the start of the reverse travel of the vehicle, such steep return operation of the accelerator pedal is not due to the recognition of the shift mistake by the driver of the vehicle. That is, the lapse of a preset time from the start of the reverse travel of the vehicle is considered as a determination criterion (i.e., a detection time) for determining whether the return operation of the accelerator pedal by the driver is performed based on the shift mistake. In other words, the shift mistake detection apparatus reserves a preset amount of time for the detection of the possible steep return operation by the driver who has recognized the shift mistake operation. Therefore, if the return operation of the accelerator pedal is performed after the lapse of the preset time from the start of the reverse travel of the vehicle, the return operation is not due to the recognition of the shift mistake by the driver.

In consideration of the above, a shift mistake operation is determined within a preset time from the shifting to the R-range. The preset time may be set based on a reaction time of a driver who releases the accelerator pedal due to the shift mistake. In such manner, a steep accelerator pedal return operation at a time exceeding the preset time from the start of the reverse travel of the vehicle will not be mis-determined as a return operation due to a shift mistake operation.

Further, for example, a determination period for determining the shift mistake to the R-range may not necessarily be limited to the preset time from the shifting to the R-range, but may be set to a preset time from a start of a first accelerator pedal step operation after the shifting to the R-range, or may be set to a preset time from a start of reverse travel of the vehicle.

Further, in the present embodiment, when a shift mistake operation has been determined, the control unit 13 restricts a driving power demand (i.e., a torque demand) for the purpose of restricting the vehicle driving force (i.e., the vehicle driving torque). In such manner, the increase of the travel speed of the vehicle during reverse travel is suppressed.

Further, when a shift mistake operation has been determined, the vehicle driving power may be shut-off. The shutting of the vehicle driving power may be performed as a shut off of an electric power supply for a motor, if the motor serves as the power source 11, or may be performed as a shut off of a fuel supply for an engine, if the engine serves as the power source 11. Further, the shut off of the power may also be performed as a release of a clutch in a drive train.

A shift mistake detection scheme and a safety scheme for the detected shift mistake are explained with reference to FIGS. 2-5. For brevity, in corresponding figures, "accelerator opening" is provided as "A.O.", "change speed" is provided as "CHG. SPD.", and "learn value" is provided as "L.V.". Other abbreviations may be used, which are known to one skilled in the art, such as "MAX" for maximum.

(Accelerator Operation Behavior Learn Process at R-Range Time)

With reference to FIG. 2, an accelerator operation behavior learn process at R-range time is repeatedly performed at regular intervals during the power-on time of the control unit 13, and the process of FIG. 2 corresponds to a learn unit in claims.

In 101, the process determines whether the current shift range detected by the shift range sensor 16 is the R-range. If it is the R-range (101:YES), the process proceeds to 102.

In 102, the process determines whether the current accelerator opening (i.e., the accelerator pedal step amount) detected by the accelerator sensor 14 is greater than a stored maximum accelerator opening value. If 102 is Yes, the process proceeds to 103 to store the current accelerator opening as the maximum accelerator opening value, and the process proceeds to 104. By repeating 102 at regular intervals, the maximum accelerator opening value (i.e., the maximum accelerator pedal step amount) after the shift to the R-range is stored in an updating manner. If 102 is No, the process directly proceeds to 104.

In 104, the process determines whether the accelerator opening change speed is a plus value, which indicates a step operation of the accelerator pedal, and whether the current accelerator opening change speed (i.e., the accelerator pedal step speed) is greater than the stored value of the maximum accelerator opening change speed. If 104 is Yes, the process proceeds to 105, and the current accelerator opening change speed is stored in an updating manner as the maximum accelerator opening change speed, and then the process proceeds to 106. By repeating such process at regular intervals, the maximum accelerator opening change speed (i.e., the maximum accelerator pedal step speed) after the shift to the R-range is stored in an updating manner. If 104 is No, the process proceeds directly to 106.

In 106 the process determines whether the accelerator opening change speed is a minus value, which indicates a return operation of the accelerator pedal, and whether the current accelerator opening change speed (i.e., the accelerator pedal return speed) is smaller than the stored value of the minimum accelerator opening change speed. If 106 is Yes, the process proceeds to 107 and stores, in an updating manner, the current accelerator opening change speed as the minimum accelerator opening change speed, and finishes the present process. By repeating such process at regular intervals, the minimum accelerator opening change speed (i.e., the fastest accelerator pedal return speed value) after the shift to the R-range is stored in an updating manner. Further, if 106 is No, the process finishes.

On the other hand, if it is determined that the shift is not in the R-range in 101 (101:No), the process proceeds to 108 to determine whether the shift range at the previous execution time of the present process was the R-range. In other words, 108 determines if the current execution time of the present process is the first execution time after the shift from the R-range to the other range. If 108 is Yes, the process proceeds to 109, but if 108 is No the present process is finished without updating each of the learn values 1 to 3.

In 109 the process calculates the learn value 1 of the maximum accelerator opening (i.e., the maximum accelerator pedal step amount), the learn value 2 of the maximum accelerator opening change speed (i.e., the fastest accelerator pedal step speed), and the learn value 3 of the minimum accelerator opening change speed (i.e., the fastest accelerator pedal return speed) according to the following equations, for the storage of those values in an updating manner, and finishes the present process.

Learn value 1=α×maximum accelerator opening (stored in current execution time of the routine)+ (1−α)×learn value 1 (previous value);

Learn value 2=α×maximum accelerator opening change speed (stored in current execution time of the routine)+(1−α)×learn value 2 (previous value);

Learn value 3=α×minimum accelerator opening change speed (stored in current execution time of the routine)+(1−α)×learn value 3 (previous value).

In the above equations, a is a weighting coefficient for determining a weight of the current execution stored value in the learn values 1 to 3, which may be designated as a "annealing" or "shading" coefficient, with its value set in a range between 0 and 1. Each of the learn values 1 to 3 is stored in an updating manner in a memory of the control unit 13 such as a backup RAM (i.e., a non-volatile memory), which retains memory contents even when the electric power to the control unit 13 is turned off, for the update of the currently learned values 1 to 3 in the current driving time based on the values 1 to 3 learned in the previous driving times.

Figure 3A:
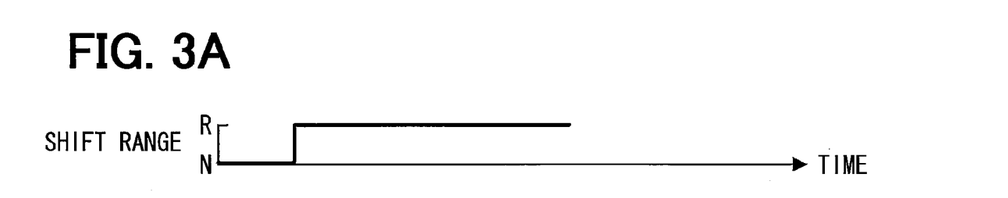
FIGS. 3A, 3B, 3C are time charts of a learning method of the present disclosure.
Figure 3B:
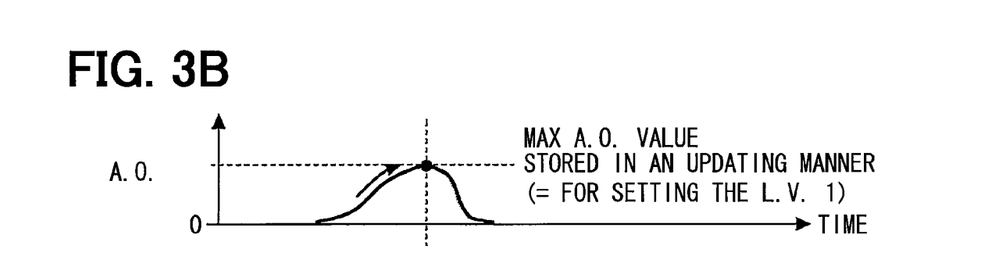
Figure 3C:
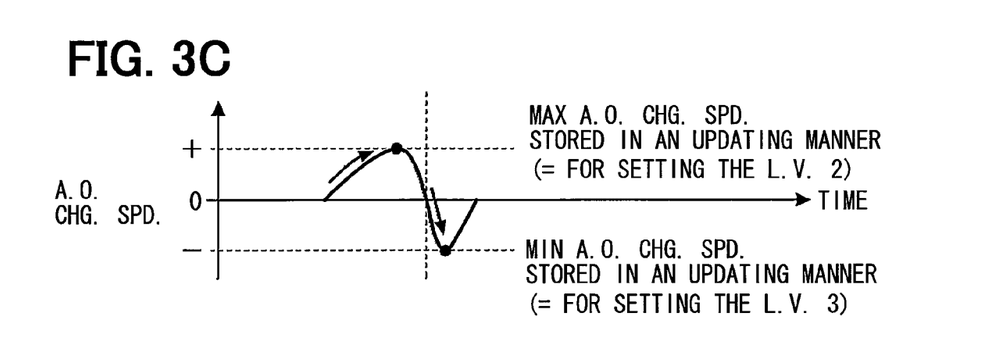

By repeatedly executing the accelerator operation behavior learn process of FIG. 2 at R-range time at regular intervals, with reference to FIGS. 3A to 3C, the maximum accelerator opening value, the maximum accelerator opening change speed, and the minimum accelerator opening change speed after the shift to the R-range are stored in an updating manner, for the update of each of the learn values 1 to 3 based on such stored values.

(Shift Mistake Detection Process)

The shift mistake detection process of FIG. 4 is repeatedly performed at regular intervals during the power-on time of the control unit 13, and corresponds to a shift mistake detection unit in claims.

In 201, the process determines whether a count value of a post R-range shift counter is smaller than a preset value Ts. The post R-range shift counter counts an elapsed time from shifting to the R-range by using a post R-range shift counter routine of FIG. 5, with the counting operation of the counter started after the shift to the R-range. Here, the preset value Ts is set, considering a time during which the driver may possibly recognize the shift mistake and may perform the steep return operation of the accelerator pedal.

In 201, if it is determined that the count value of the post R-range shift counter is smaller than the preset value Ts (201:Yes). In other words, if the elapsed time from the shift to the R-range is determined as smaller than the preset period of time (i.e. Ts), the process proceeds to 202, and a shift mistake determination period flag is set to ON, which indicates that currently it is in a shift mistake determination period for determining the shift mistake.

The process proceeds to 103 to determine whether (i) the previous accelerator opening value is smaller than learn value 1 and (ii) the current accelerator opening value is greater than the learn value 1 and (iii) the accelerator opening change speed is greater than the learn value 2. If 103 is Yes, it is determined that the accelerator operation is steeper than the normal back up operation, and the process proceeds to 204, turning ON a steep accelerator ON flag, and the process proceeds to 205. The reason for determining in 203 whether the previous accelerator opening value is smaller than the learn value 1 and the current accelerator opening value is greater than the learn value 1 is that, in the present embodiment, whether an accelerator pedal step operation is steeper than the operation at the normal back up time of the vehicle is determined based on the accelerator opening change speed exceeding the learn value 2 at the moment when or as soon as the accelerator opening detected by the accelerator sensor 14 exceeds the learn value 1. If the determination in 203 is No, the process proceeds directly to 205.

In 205, the process determines whether (i) the previous accelerator opening value is greater than the learn value 1 and (ii) the current accelerator opening value is smaller than the learn value 1 and (iii) the accelerator opening change speed is smaller than the learn value 3. If 205 is Yes, it is determined that the release is steeper than the release for the normal back up time, and the process proceeds to 206, turning ON a steep accelerator OFF flag, and the process proceeds to 207. The reason for determining in 205 whether the previous accelerator opening value is greater than the learn value 1 and the current accelerator opening value is smaller than the learn value 1 is that, in the present embodiment, whether an accelerator pedal return operation is steeper than the operation at the normal back up time of the vehicle is based on the accelerator opening change speed falling below the learn value 3 at the moment when or as soon as the accelerator opening detected by the accelerator sensor 14 falls below the learn value 1. If 205 is No, the process proceeds to 207.

In 207, the process determines whether the steep accelerator ON flag is ON and the steep accelerator OFF flag is ON. By doing so, the process determines whether the accelerator operation after the shift to the R-range is steeper than the operation at the normal back up time. If 207 is Yes, it is determined that a shift mistake is happening, and the process proceeds to 208 to turn ON a driving power restriction flag. The process proceeds to 209 to restrict the driving power demand (i.e., the torque demand), for restricting the vehicle driving power (i.e., the vehicle driving torque). In such manner, an increase in the speed of the vehicle during reverse travel is suppressed, and the safety at the time of the shift mistake to the R-range is improved. If 207 is No, the process determines that the shift mistake is not happening, and the present process is finished.

On the other hand, if it is determined that the count value of the post R-range shift counter is equal to or greater than the value Ts (201:No), the process determines that the shift mistake determination period is finished, and the process proceeds to 210. In 210 the steep accelerator ON flag, the steep accelerator OFF flag, the driving power restriction flag, and the shift mistake determination period flag are turned OFF (i.e., reset, or maintain an already-reset condition), and the present process is finished.

(Post R-range Shift Counter Process)

The post R-range shift counter process of FIG. 5 is repeatedly performed at regular intervals during the power-on time of the control unit 13.

In 301, the process determines whether the previous shift is a shift to a range other than the R-range and the current shift is a shift to the R-range. In other words, it is determined whether the current shift is a shift from an other-than-R-range to the R-range. If 301 is Yes, the process proceeds to 302, and the count value of the post R-range shift counter is reset to "0". The process proceeds to 303 to increment the count value of the post R range shift counter and the process is finished.

On the other hand, if 301 is No, that is, if it is not immediately after the shift to the R-range, the process proceeds to 303 to increment the post R-range shift counter, and the present process is finished. In such manner, the post R-range shift counter is reset and is started every time the gear is shifted to the R-range, for repeatedly counting the elapsed time from the shift to the R-range at regular intervals. Further, if the count value of the post R-range shift counter exceeds the preset value Ts and reaches an upper limit value, the count value of the post R-range shift counter is kept at such upper limit value.

Figure 6:
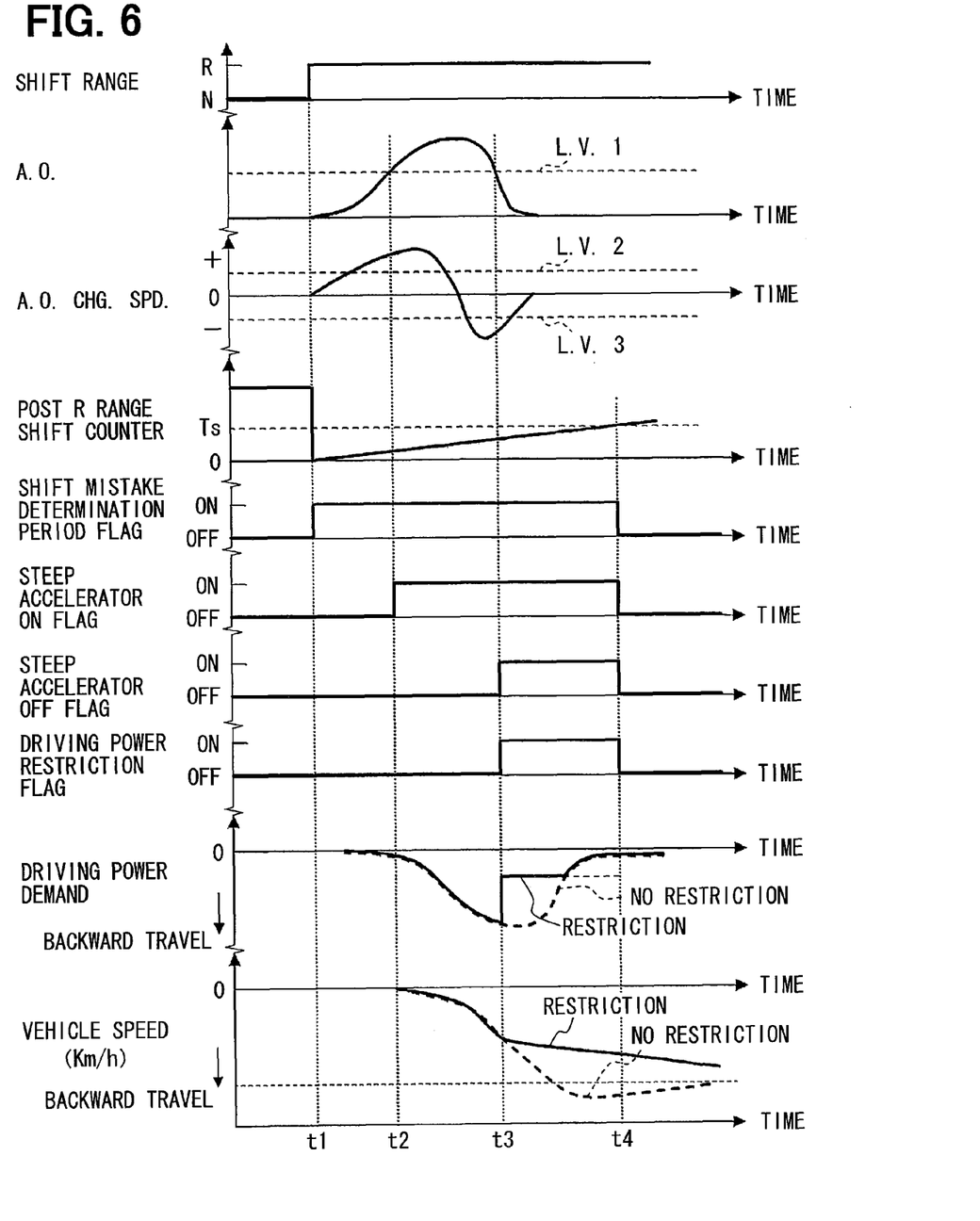
FIG. 6 is a time chart of a shift mistake detection method of the present disclosure.

The shift mistake detection method in the present embodiment is now described with an example provided as a time chart of FIG. 6. In FIG. 6, inputs are provided as shift range, accelerator opening, and accelerator opening change speed. The processing state provides post R range shift counter, shift mistake determination period flag, steep accelerator on flag, steep accelerator off flag, driving power restriction flag, and driving power demand. The output is provided as vehicle speed.

In the example of FIG. 6 at time t1, the driver shifts the gear (i.e., the shift range) from the N-range (neutral range) to the R-range. Therefore, the count value of the post R-range shift counter is reset, and the count operation for counting the elapsed time from the shift to the R-range is started. Further, the shift mistake determination period flag is turned ON, and a process to determine the shift mistake is started.

Then, at time t2, at which the accelerator opening detected by the accelerator sensor 14 exceeds the learn value 1, it is determined that the accelerator pedal step operation is steeper than the operation at the normal back up time due to the accelerator opening change speed exceeding the learn value 2, and thus the steep accelerator ON flag is turned ON.

Then, at time t3, at which the accelerator opening detected by accelerator sensor 14 falls below the learn value 1, it is determined that the accelerator pedal return operation is steeper than the operation at the normal back up time due to the accelerator opening change speed falling below the learn value 3, and the steep accelerator OFF flag is turned ON. In such manner, since both the steep accelerator ON flag and the steep accelerator OFF flag are turned ON, it is determined that, after the shift to the R-range, both of a steep accelerator pedal step operation and a steep accelerator pedal return operation steeper than the operation at the normal back up time are performed. Therefore, the driving power restriction flag is turned ON, and the driving power demand (i.e., the torque demand) is restricted for the purpose of restricting the vehicle driving force (i.e., the vehicle driving torque), and for preventing the increase of the travel speed of the vehicle during reverse travel.

Then, at time t4, at which the count value of the post R-range shift counter reaches the preset value Ts, all the flags, that is, the shift mistake determination period flag, the steep accelerator ON flag, the steep accelerator OFF flag, and the driving power restriction flag are reset to OFF, for releasing the restriction on the driving power demand.

In the above-described embodiment, for the purpose of detecting the shift mistake, which is detected as a situation in which, after the shift of the gear to the R-range by the driver is detected based on a detection result of the shift range detector 16, and, at a time of a start of back up of a vehicle according to an accelerator pedal step operation by the driver, both a steep step operation and a steep return operation of the accelerator pedal by the driver is detected, and such step and return operations is detected based on a detection value by the accelerator sensor 14 as being equal to or greater than a threshold.

Further, in the present embodiment, the operational tendency of the accelerator pedal step operation and the return operation of the accelerator pedal at a normal back up time is learned based on the detection value of the accelerator sensor 14 after the shift to the R-range, and the operational tendency of the accelerator pedal step operation and the return operation of the accelerator pedal at a normal back up time based on the detected value of the accelerator sensor 14 after the shift to the R-range is compared with the learn value, for the purpose of determining whether the detected operations are steeper than the operation at the normal back up time. Therefore, tendency of the accelerator pedal step/return operation at the normal time is learned, and the steeper accelerator pedal step/return operation is accurately detected based on the comparison between the steeper accelerator pedal step/return operation and the normal accelerator pedal step/return operation.

Based on the present embodiment, when the vehicle has to go over, or "climb" a small barrier, such as a bump, just after or at the moment of starting from a stop condition, the present disclosure prevents a mis-determination of the following operation as a shift mistake. That is, a large amount (i.e., an over-threshold amount) of accelerator pedal operation to increase a vehicle driving torque according to an intention of the driver will not be mis-determined as a shift mistake, because the driver does not perform a steep return operation of the accelerator pedal when the vehicle starts to move in the reverse direction.

In the present disclosure, a behavior or tendency of a standard driver at a normal vehicle back up time, or, more specifically, a normal accelerator pedal return operation may be sampled for setting a determination value (i.e., a threshold). The steep return operation of the accelerator pedal may be determined based on a comparison between the behavior of the accelerator pedal return operation after the shift to the reverse range and the determination value.

However, since an operation of the accelerator pedal may vary driver to driver, only one predetermined threshold for uniformly determining the steep return operation may lead to a mis-determination of the steepness of the detected operation.

Therefore, a learn unit for learning a behavior of an accelerator pedal return operation after a shift to the reverse range may be provided. A steep return operation of the accelerator pedal may be determined, based on a comparison between (i) the behavior of the return operation of the accelerator pedal that is detected after the shift to the reverse range and (ii) a learn value of the learn unit.

Since the behavior of the return operation of the accelerator pedal may vary driver to driver, by learning the behavior of the return operation of the accelerator pedal after the shift to the reverse range in advance, the behavior of the return operation of the accelerator pedal at a normal back up time can be learned as the learn value. Such learned behavior of the normal back up time can be more accurately compared with the behavior of the return operation that has been hastily performed by the driver at the time of shift mistake.

The learn unit learns, as the behavior of the return operation of the accelerator pedal, a maximum value of the return speed of the accelerator pedal, and the shift mistake may determine the steep return operation of the accelerator pedal when the return speed of the accelerator pedal after the shift to the reverse range is greater than the learn value of the learn unit. In such manner, the return operation of the accelerator pedal hastily performed by the driver at the time of the shift mistake is easily and accurately detected.

A shift mistake may be determined when a steep step operation and the steep return operation of the accelerator pedal is detected and is provided as having a value greater than or equal to a preset value at a start time of a reverse travel of the vehicle. In such manner, the detection accuracy for detecting the shift mistake that mistakenly shifts the gear into the reverse range is improved.

The steep step operation and the steep return operation may be determined by comparing, respectively with the learn value of the learn unit, the detected behavior of the step operation and the return operation of the accelerator pedal after the shift to the reverse range. Since the behavior of the step operation and the return operation of the accelerator pedal may vary driver to driver, by learning both the behavior of the step operation and the return operation after the shift to the reverse range in advance, the behavior of the step operation and the behavior of the return operation during a normal back up time can be learned, and such learned behaviors of the normal back up time can be more accurately compared with the detected behavior of the step operation and the return operation that have been hastily performed by the driver at the time of shift mistake.

The learn unit learns, as the behavior of the step operation, a maximum value of an accelerator pedal step speed and a maximum value of an accelerator pedal step amount, and learns as the behavior of the return operation of the accelerator pedal, a maximum value of an accelerator pedal return speed. In such manner, the tendencies of the accelerator pedal step operation and the return operation of the accelerator pedal performed by the driver are easily learned.

A steep step operation of the accelerator pedal may be determined when (i) the accelerator pedal step amount detected after the shift to the reverse range is greater than a learn value of the accelerator pedal step amount learned by the learn unit, and (ii) the accelerator pedal step speed is greater than a learn value of the accelerator pedal step speed learned by the learn unit. In such manner, the steep accelerator pedal step operation at the time of shift mistake is easily and accurately detected.

A steep return operation of the accelerator pedal may be determined when (i) the accelerator pedal step amount detected after the shift to the reverse range is smaller than a learn value of the accelerator pedal step amount learned by the learn unit, and (ii) the accelerator pedal step speed is greater than a learn value of the accelerator pedal step speed learned by the learn unit. In such manner, the steep return operation of the accelerator pedal at the time of shift mistake is easily and accurately detected.

A shift mistake to the reverse range may be determined as being performed or not for a preset time period either (i) from the shift to the reverse range, or (ii) from a first step operation of the accelerator pedal after the shift to the reverse range, or (iii) from a start of the back up of the vehicle. In this case, the preset period may be set in consideration of the time period during which the driver may possibly perform the steep return operation of the accelerator pedal by recognizing his/her own shift mistake to the reverse range. In such manner, even if the steep return operation of the accelerator pedal is performed after the preset period during which the driver possibly performs the steep return operation of the accelerator pedal by recognizing his/her own shift mistake to the reverse range, such steep return operation after the preset period is prevented from being mis-determined as the shift mistake.

When it is determined a shift mistake is in progress, a vehicle driving power is either restricted or shut off. In such manner, an increase of the vehicle speed at the time of shift mistake to the reverse range is prevented, and the safety at the time of shift mistake is improved.

Although the current disclosure has been fully described in connection with preferred embodiment thereof with reference to the accompanying drawings, it is to be noted that various changes and modifications will become apparent to those skilled in the art.

In the above embodiment, it is determined as the shift mistake when, after the shift to the R-range, the vehicle starts to back up according to an accelerator pedal step operation at the time of detecting both of the steeper accelerator pedal step and return operations steeper than the normal back up. However, such determination may be based only on the steeper accelerator pedal return operation when, after the shift to the R-range, the vehicle starts to back up according to an accelerator pedal step operation, based on the detection value of the accelerator sensor 14. Even in such case, the determination method of determining the steeper-than-normal accelerator pedal return operation may be same as the above embodiment.

Further, the present disclosure may have a selection function for manually selecting two operation modes/options, one for detecting the shift mistake (and for performing a vehicle driving torque restriction at the time of detecting the shift mistake) and the other for not detecting the shift mistake.

Further, a function that allows the driver to arbitrarily set the shift mistake detection period may be added.

Further, the present disclosure may be applicable to a manual transmission vehicle that is not equipped with the automatic transmission, and the present disclosure may have different behavior learn method for learning the accelerator pedal step/return operation, and the present disclosure may have different method for determining a steeper-than-normal accelerator pedal step/return operation.

Such changes, modifications, and summarized schemes are to be understood as being within the scope of the current disclosure as defined by appended claims.

What is claimed is:

1. A shift mistake detection apparatus comprising:
an accelerator pedal step amount detection unit detecting an operation value of an accelerator pedal in a vehicle;
a shift range detection unit detecting a shift range selected by a shift operation; and
a shift mistake detection unit detecting a shift mistake, wherein the shift mistake detection unit detects a shift mistake when (i) the shift range selected by the shift operation is in a reverse range based on a detection result of the shift range detection unit and the vehicle begins to travel in reverse according to an operation of the accelerator pedal, and (ii) an abnormal return operation of the accelerator pedal is detected, the abnormal return operation of the accelerator pedal having an operation value detected by the accelerator pedal step amount detection unit that is greater than or equal to a threshold.

2. The shift mistake detection apparatus of claim 1 further comprising:
a learn unit learning a behavior of a return operation of the accelerator pedal detected by the accelerator pedal step amount detection unit after a shift to the reverse range, wherein
the shift mistake detection unit determines whether an abnormal return operation of the accelerator pedal has been performed, based on a comparison between (i) the behavior of the return operation of the accelerator pedal and (ii) a learn value of the learn unit.

3. The shift mistake detection apparatus of claim 2, wherein
the learn unit learns, as the behavior of the return operation of the accelerator pedal, a maximum value of a return speed of the accelerator pedal detected by the accelerator pedal step amount detection unit as the operation value after the shift to the reverse range, and
the shift mistake detection unit determines the abnormal return operation of the accelerator pedal when the return speed of the accelerator pedal is greater than the learn value of the learn unit.

4. The shift mistake detection apparatus of claim 1, wherein
the shift mistake detection unit determines the shift mistake when an abnormal step operation and the abnormal return operation of the accelerator pedal is detected, the abnormal step operation of the accelerator pedal having an operation value detected by the accelerator pedal step amount detection unit that is greater than or equal to a threshold.

5. The shift mistake detection apparatus of claim 4 further comprising:
a learn unit learning a behavior of a step operation and a return operation of the accelerator pedal detected by the accelerator pedal step amount detection unit after a shift to the reverse range, wherein
the shift mistake detection unit determines the abnormal step operation and the abnormal return operation of the accelerator pedal by comparing, respectively with a learn value of the learn unit, the behavior of the step operation and the behavior of the return operation of the accelerator pedal.

6. The shift mistake detection apparatus of claim 5, wherein
the learn unit learns, as the behavior of the step operation of the accelerator pedal, a maximum value of an accelerator pedal step speed and a maximum value of an accelerator pedal step amount, and learns, as the behavior of the return operation of the accelerator pedal, a maximum value of an accelerator pedal return speed.

7. The shift mistake detection apparatus of claim 6, wherein
the shift mistake detection unit determines the abnormal step operation of the accelerator pedal when (i) the accelerator pedal step amount detected after the shift to the reverse range based on the operation value detected by the accelerator pedal step amount detection unit is greater than a learn value of the accelerator pedal step amount learned by the learn unit, and (ii) the accelerator pedal step speed is greater than a learn value of the accelerator pedal step speed learned by the learn unit.

8. The shift mistake detection apparatus of claim 6, wherein
the shift mistake detection unit determines the abnormal step operation of the accelerator pedal when (i) the accelerator pedal step amount detected after the shift to the reverse range based on the operation value detected by the accelerator pedal step amount detection unit is smaller than a learn value of the accelerator pedal step amount learned by the learn unit, and (ii) the accelerator pedal step speed is greater than a learn value of the accelerator pedal step speed learned by the learn unit.

9. The shift mistake detection apparatus of claim 1, wherein
the shift mistake detection unit determines whether the shift mistake to the reverse range has been performed or not for a preset time period either (i) from the shift to the reverse range, or (ii) from a first step operation of the accelerator pedal after the shift to the reverse range, or (iii) from a start of reverse travel of the vehicle.

10. The shift mistake detection apparatus of claim 1, wherein
the shift mistake detection unit either restricts or shuts off a vehicle driving power when it is determined that the shift mistake is in progress.

* * * * *